INVENTOR
Eugene A. Skweir
BY
Robert A. Shields
ATTORNEY

Patented Mar. 3, 1953

2,630,292

UNITED STATES PATENT OFFICE 2,630,292

BALANCED VALVE

Eugene A. Skweir, McAdoo, Pa., assignor to American Car and Foundry Company, New York, N. Y., a corporation of New Jersey Application March 24, 1948, Serial No. 16,700

5 Claims. (Cl. 251—50)

This invention relates to valves in general and in particular to larger size valves intended for use on high pressure lines.

Valves as generally built have required wrenches in the smaller sizes and gearing or power mechanism of some sort to operate the larger sizes. The use of any power device to operate the valve is not only troublesome but extremely expensive and in many instances can not be used, for example on tank cars where the discharge valves are located in a dome with small clearances. It is an object, therefore, of the present invention to provide a compact valve of the balanced type having extremely low operating torque even under high pressures.

A further object of the invention is the provision of a compact balanced valve in which all points of possible leakage are sealed by self-actuating packing having low frictional drag.

A still further object of the invention is the provision of a balanced valve having a removable reaction plug and stem guide mounted in the body and wholly enclosed thereby.

Figure 1:
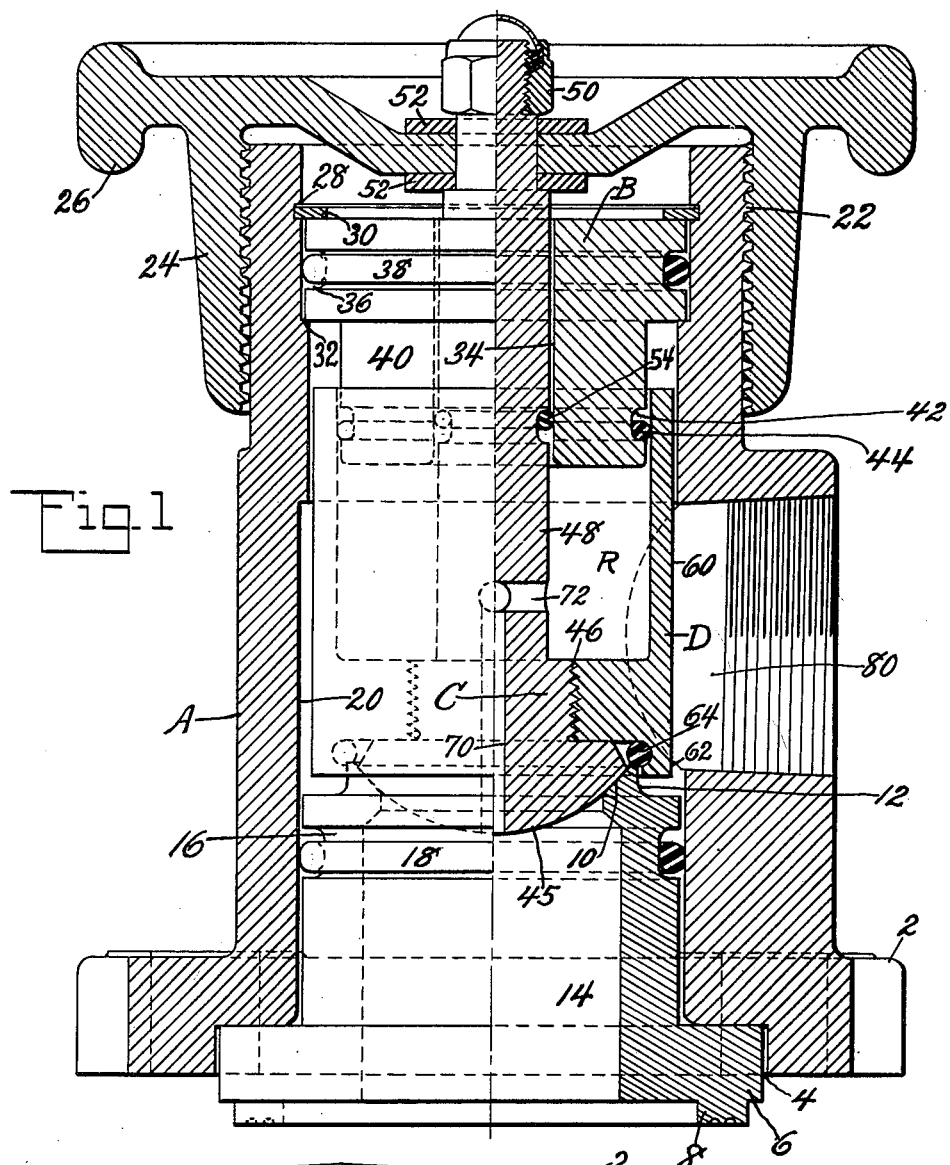
Figure 2:
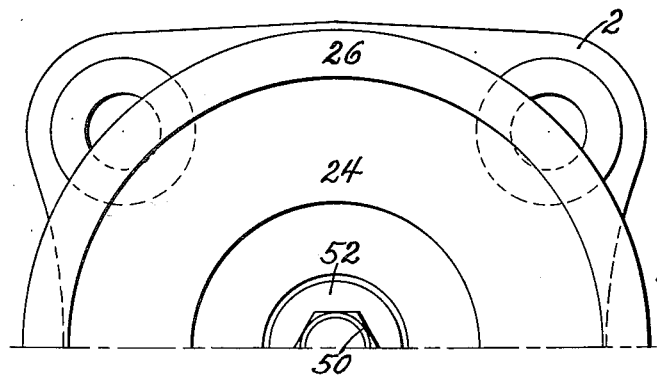

These and other objects of the invention will be apparent to persons skilled in the art from a study of the following description and accompanying drawings, in which Fig. 1 is a sectional view taken through the valve, and Fig. 2 is a plan view of substantially one-half the valve.

Referring now to the drawings in detail, it will be seen that the body A of the valve is formed with a lower bolting flange 2 having part removed as at 4 to receive a removable seat and sealing member 6. This removable member is formed with a projecting portion 8 grooved to cooperate with a sealing member on the tank or other structure to which the valve is attached. The sealing member as shown projects upwardly into the valve body and is formed adjacent its upper edge with a metallic seat 10 terminating in a lip 12. The inner portion of the seat and sealing member is bored on the inside to form a passage 14 and has a groove 16 cut in its outer surface and adapted to receive a ring 18 of circular cross-section and preferably formed of a resilient material. The groove 16 and ring 18 are of such a depth and size as to lightly compress the ring 18 against the inner surface or bore 20 formed in the valve body A, thus the ring will effectively seal any leakage of material past the removable seat member. When desired the seat member may be made integral with the valve body without in any way affecting the operation or construction of the remainder of the valve. The body A extends upwardly above the bolting flange 2 and has its upper exterior surface threaded as at 22 to receive cooperating threads formed on the interior of an operating hand wheel 24. This operating hand wheel is provided with a gripping rim portion 26 and a central opening through which will extend the upper end of the valve stem. On the interior of the body adjacent the top a groove 28 is cut, which groove is adapted to receive a resilient snap ring 30. The upper portion of the body interior is counterbored as shown to provide a shoulder 32 upon which the reaction plug and stem guide B may be held by the snap ring 30.

The reaction plug and stem guide member B is provided with a central opening 34 adapted to receive the valve stem, but of such a size as to have a slight clearance therewith. The upper enlarged portion of the reaction plug and stem guide is grooved as at 36 to receive a resilient ring 38 of substantially circular cross-section and which ring is lightly compressed between the base of groove 36 and the counterbored portion of the valve body. This ring will effectively seal any leakage between the reaction plug and the valve body and will, in conjunction with the snap ring 30, obviate the necessity of using threads and packing means to retain the member and prevent leakage. The lower portion 40 of the reaction member is reduced in diameter and extended downwardly toward the bottom portion of the valve and has its lower end grooved as at 42 to receive a resilient ring 44 of circular cross-section and for a purpose later to be described.

The valve member C is formed with a hemispherical bottom portion 45 adapted to have metallic contact with the seat 10 of the valve body. From this hemispherical end the valve extends upwardly to provide an enlarged threaded stem portion 46, merging into a stem 48 of reduced diameter, which stem extends upwardly through the reaction plug and stem guide member B. The upper portion of this stem is again reduced in diameter to pass through the hand wheel 24 and to receive a nut 50 by means of which the stem is held in place with respect to the hand wheel. In order to reduce friction, washers 52, preferably made of oil impregnated metal, are positioned above and below the hand wheel and in such a position as to take any thrust incident to the opening or closing of the valve. The valve stem 48 as shown is grooved to receive a resilient ring 54 of circular cross-section, which ring is lightly compressed between the stem groove and the interior of passage 34 of the reaction plug and guide member. This ring will effectively seal leakage between the members.

Threaded upon the enlarged portion 46 of the valve stem is a cup member D having an upstanding circular wall 60 adapted to have sliding relation with respect to the interior of the valve body. The interior of the wall is finished smooth and adapted to lightly compress the ring 44, thereby preventing leakage between the wall of the cup member and the reaction plug B. From the lower portion of the cup-like member a wall 62 extends downwardly and has its interior rounded out to receive a ring 64 formed of resilient material of circular cross-section, this ring being retained by the wall 62 and by the edge of the hemispherical valve portion 45. This ring 64 will be lightly compressed between the cup member D and the edge of lip 12. Any leakage of matter past the seat 10 will tend to force the ring into the clearance between wall 62 and the outer surface of lip 12, thus this ring will effectively seal any leakage between the hemispherical valve and the valve seat 10. Metallic contact between the hemispherical portion 45 and seat 10 will limit the mechanical compression that can be placed upon the ring 64, thereby preventing damage of this ring.

In order to balance the valve a small passage 70 is bored upwardly into the stem 48 and joins with a horizontal passage 72 whereby matter under pressure below the valve may flow upwardly into reaction chamber R. This reaction chamber is bounded on the sides by the wall 60 of cup member D and by stem 48 of the valve C. It is also bounded on the top by the lower end of reaction plug member B and on the bottom by the enlarged valve stem and cup bottom. This reaction chamber is of such a size that its bottom area is substantially identical to the area of the hemispherical valve portion 45 exposed to pressure in passage 14. Since the areas are the same and the pressures the same due to passages 70 and 72 there can be no thrust in a vertical drive on the valve stem or seat caused by line pressure. The upward pressure in reaction chamber R will be directly absorbed by snap ring 30 fastened to the body and can not be transmitted to the stem or hand wheel. By making the reaction chamber bottom of substantially the same area as the exposed portion of hemispherical part 45, the upward thrust on the area of the valve stem is overcome and the valve is fully balanced. Under actual test it has been proven that a two inch valve constructed as described will operate with almost identical torque whether under zero or five hundred pounds pressure.

The valve may be readily constructed by merely grinding or turning the parts to the required clearances, then placing the circular rings in their grooves and dropping the parts into the valve body. After being placed in the body they are effectively locked by the snap ring 30, after which the hand wheel may be screwed onto the body and fastened to the stem so as to lift the same upon rotation of the hand wheel. With the valve closed as shown in Fig. 1 high pressure in passage 14 is effectively blocked by metallic seat 10 and resilient ring 64 from escaping into the outlet passage 80. The high pressure in passage 14 can not press upwardly on the stem and jam the threads 22 since the pressure can pass through passages 70 and 72 into the reaction chamber R. Escape of high pressure matter from reaction chamber R is prevented by resilient sealing rings 44 and 54. When the hand wheel is operated the valve stem and attached cup member D will be lifted upwardly, thereby permitting flow of matter from passage 14 into passage 80. Any leakage from the passage 80 out of the valve is prevented by resilient ring 38. It should be noted that in cases where it is desired to use passage 80 as the high pressure side, it will in no wise effect the balanced feature of the valve since the edges of walls 60 and 62 will be exposed to the same pressure. In case the passage 80 is the high pressure side, the lip 12 may be made slightly lower than shown so that the ring 64 can be jammed inward by the pressure and prevent any leakage past the lip 12 and hemispherical portion 45, although tests have shown that such a change is not necessary.

While the valve has been described more or less in detail with specific reference to one form thereof, it is obvious that various modifications and rearrangements of parts may be made without departing from the scope of the claims defining my invention.

What is claimed is:

1. A balanced valve comprising a body having inlet and outlet ports therein, a body valve seat carried by said body, a valve adapted to be seated on said body valve seat and control flow of matter between the ports, a stem extending from said valve and having its lower end formed to engage the body valve seat in metal to metal contact, a cup member secured to said stem and having a wall paralleling said stem in spaced relation thereto and having the lower edge thereof located in predetermined spaced overlapping relationship to said body valve seat, and resilient sealing means retained by said lower edge and lower end of said stem in position to contact portions of said body valve seat outwardly of the metal to metal contact, a reaction member carried by said body and extending into the space between said stem and cup wall, a passageway extending through said valve and stem to bypass the body valve seat and to connect said inlet port and the space beneath said reaction member for the passage of matter therebetween, and sealing means interposed between said stem and reaction member and between said cup wall and reaction member to prevent escape of matter to the outlet port.

2. A balanced valve comprising a body having inlet and outlet ports therein, a body valve seat carried by said body, an upwardly open cup shaped valve having a stem extending upwardly from the central portion of the cup in substantial parallelism with the wall of the cup, a valve seat formed on the bottom of said cup shaped member and adapted to seat in a metal to metal contact zone on said body valve seat, a resilient sealing means carried by said cup shaped valve and adapted to engage the body valve seat in spaced relationship to said metal to metal contact zone and acting therewith to control flow of matter between said ports, a reaction member anchored within said body and having a portion extending into the cup shaped valve to form therewith a reaction chamber, and a passage extending through said cup shaped valve member bypassing the body valve seat and connecting said inlet port and reaction chamber whereby matter may flow therebetween.

3. A balanced valve comprising a body having inlet and outlet ports therein, a body valve seat carried by said body, an upwardly open cup shaped valve having a stem extending upwardly from the central portion of the cup in substantial parallelism with the wall of the cup, a valve seat formed on the bottom of said cup shaped member and adapted to seat in a metal to metal contact zone on said body valve seat, a resilient sealing means carried by said cup shaped valve and adapted to engage the body valve seat in spaced relationship to said metal to metal contact zone and acting therewith to control flow of matter between said ports, a reaction member anchored within said body and having a portion extending into the cup shaped valve to form therewith a reaction chamber, and a passage extending through said cup shaped valve member and connecting said inlet port and reaction chamber whereby matter may flow therebetween, said reaction chamber having a bottom area substantially equal to the bottom area of said cup shaped valve measured out to said resilient sealing means and which is exposed in the inlet port when said valve is substantially closed.

4. A balanced valve comprising a body having inlet and outlet ports therein, a body valve seat carried by said body between said inlet and outlet ports, a cup shaped valve having a stem extending from the bottom in spaced parallelism with the wall of said cup shaped valve, a valve seat formed on the bottom of said cup shaped valve and adapted to engage said body valve seat in a first contact zone, a resilient ring of circular cross-section carried by the bottom of said cup shaped valve adjacent the valve seat and adapted to contact a portion thereof in a second contact zone, a reaction member retained wholly within said body and formed with a portion projecting into the space between said stem and wall of the cup shaped valve to form a reaction chamber, a passage bypassing the valve seat contact zones and connecting one of said ports and the reaction chamber for passage of matter therebetween, and resilient rings of circular cross-section sealing the spaces between said projecting portion, stem and wall to prevent bypassed matter from reaching the other of said ports.

5. As an article of manufacture, a valve member having an operating stem terminating at its lowest end in a first seat portion, an upwardly open cup like member having a bottom connected to said stem and walls projecting upwardly and downwardly from said bottom in spaced substantial parallelism with said stem to provide open space between said walls and stem, a substantially semi-circular groove interrupting the inner surface of the downwardly projecting wall, and a resilient ring of circular cross-section retained in said groove by said stem and constituting a second seat portion positioned outwardly of said first seat portion.

EUGENE A. SKWEIR.

REFERENCES CITED

The following references are of record in the file of this patent:

UNITED STATES PATENTS

| Number | Name | Date |
|---|---|---|
| 566,108 | Wood | Aug. 18, 1896 |
| 788,867 | Wehner | Mar. 2, 1905 |
| 1,767,445 | Gilbert | June 24, 1930 |
| 1,818,856 | Langdon | Aug. 11, 1931 |
| 2,311,009 | Urquhart | Feb. 16, 1943 |
| 2,414,451 | Christensen | Jan. 21, 1947 |
| 2,417,494 | Hoof | Mar. 18, 1947 |

FOREIGN PATENTS

| Number | Country | Date |
|---|---|---|
| 421 | Great Britain | of 1885 |
| 505 | Great Britain | of 1904 |